Figure 1:
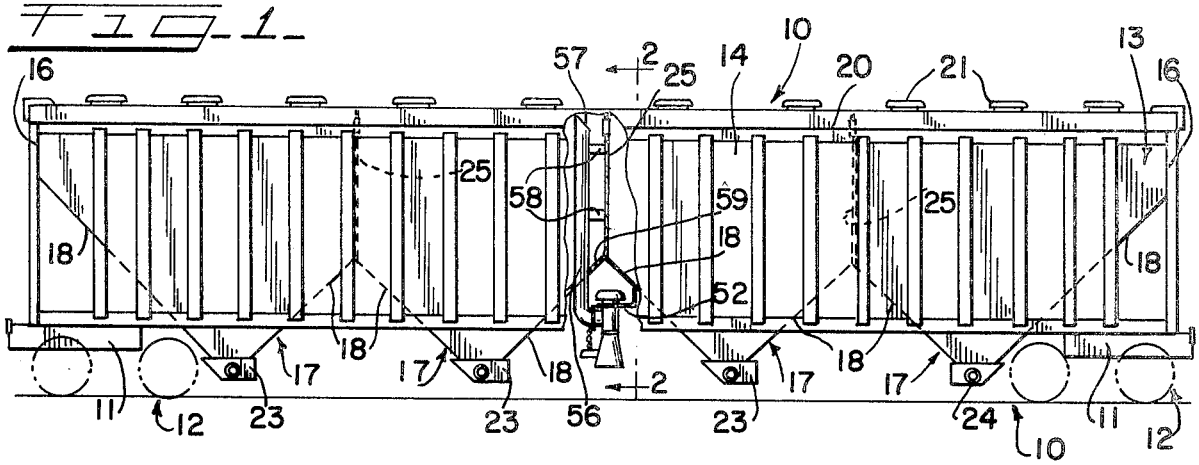
Figure 2:
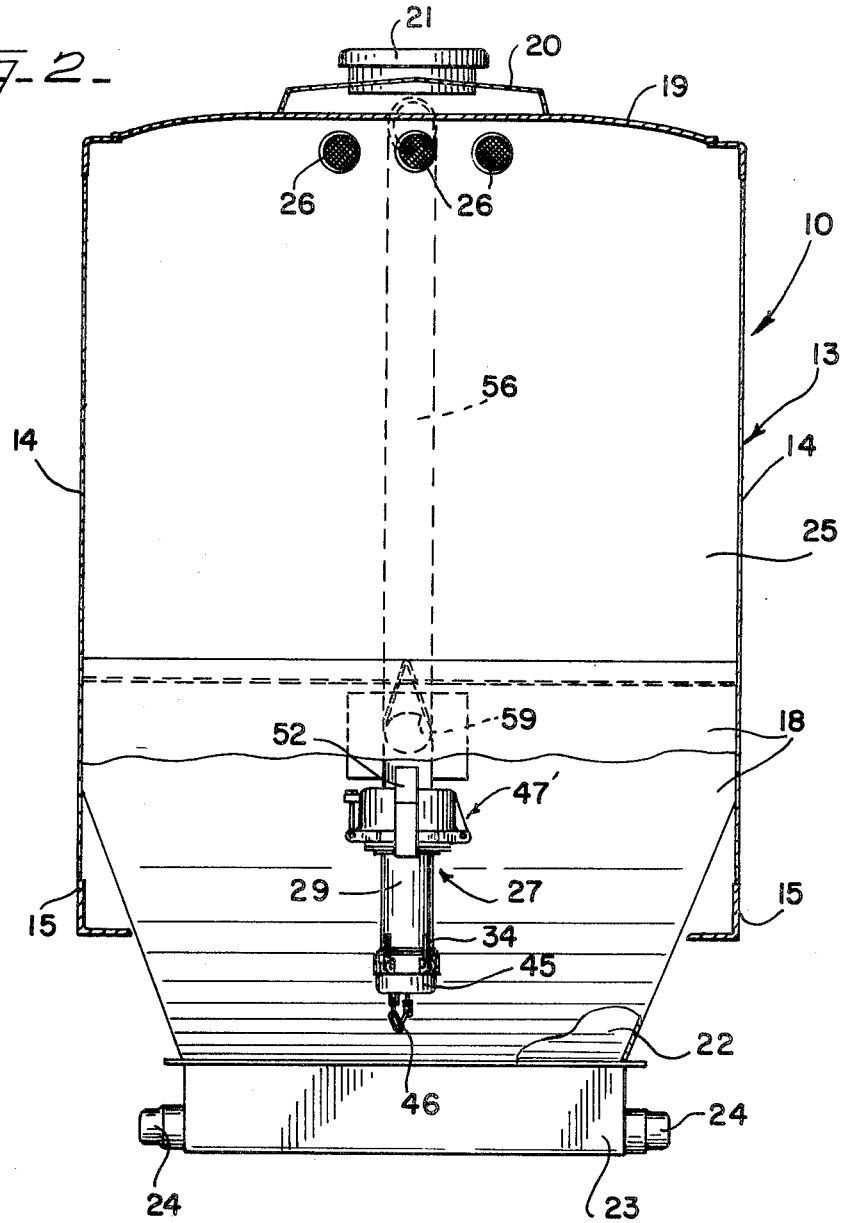

United States Defensive Publication [19] (H) [11] T983,010

Adler [43] Jun. 5, 1979

[54] VENTING STRUCTURE FOR RAILWAY CAR

[75] Inventor: Franklin P. Adler, Michigan City, Ind.

[73] Assignee: Pullman Incorporated, Chicago, Ill.

[21] Appl. No.: 919,019

[22] Filed: Jun. 26, 1978

[51] Int. Cl.[2] ..... B65G 53/40

[52] U.S. Cl. ..... 406/123; 98/6; 406/130

[57] ABSTRACT

A closed top railway hopper car of a type which is pneumatically unloaded including a pressure relief valve arrangement which is supported underneath the car between spaced slope sheets of adjacent hoppers. The relief valve arrangement includes a pipe which projects upwardly through a slope sheet into the interior of the car adjacent the upper end thereof. The relief valve is located in a protected V-shaped space beneath the hoppers where it is readily accessable to the operator standing on the ground when pneumatic devices are utilized for discharging the material from the hopper car.

10 Claims, 2 Sheets Drawing,

11 Pages Specification

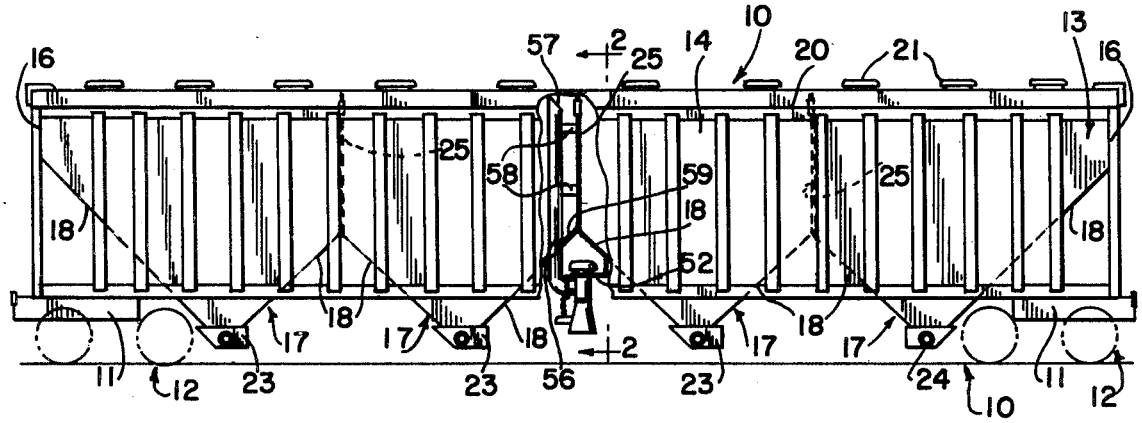

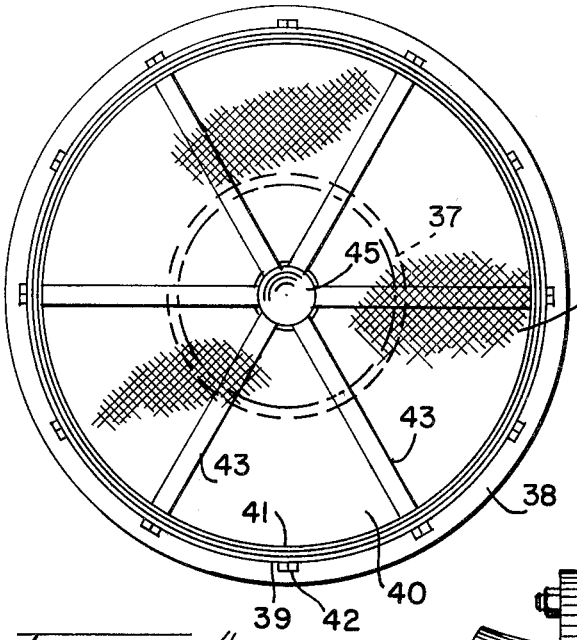
FIG. 4
FIG. 3
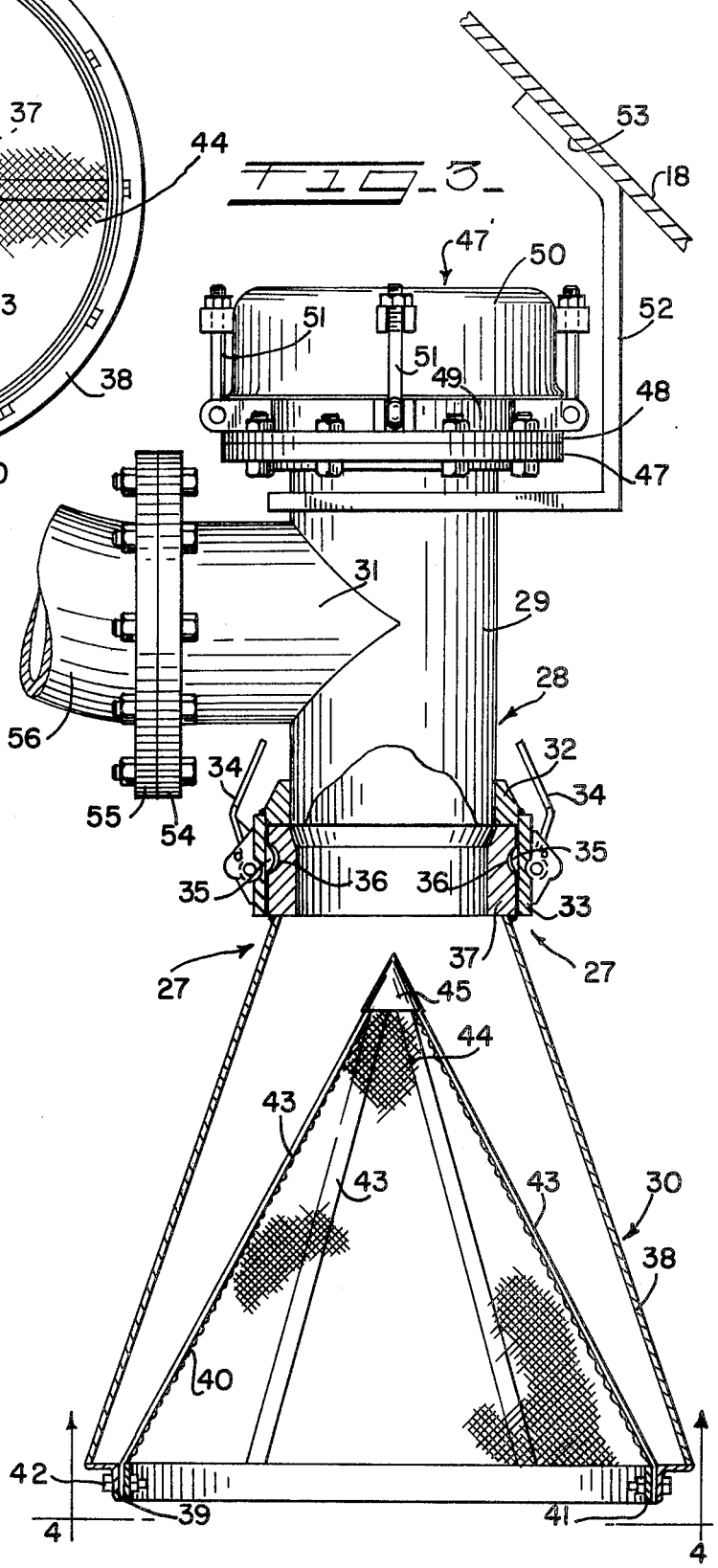

The file of this unexamined application may be inspected and copies thereof may be purchased (849 O.G. 1221, Apr. 9, 1968).